US010355366B2

(12) United States Patent
Kanhere et al.

(10) Patent No.: US 10,355,366 B2
(45) Date of Patent: Jul. 16, 2019

(54) MICROWAVE ABSORBING COMPOSITE FOR TURBINE BLADE APPLICATIONS

(71) Applicants: NANYANG TECHNOLOGICAL UNIVERSITY, Singapore (SG); GAMESA INNOVATION & TECHNOLOGY, S.L., Sarriguren (Navarra) (ES)

(72) Inventors: Pushkar Dilip Kanhere, Singapore (SG); Weng Chye Jeffrey Ho, Singapore (SG); Xinghua Wu, Singapore (SG); Eng Kee Chua, Singapore (SG); Srikanth Narasimalu, Singapore (SG); Kye Yak See, Singapore (SG); Zhong Chen, Singapore (SG); Jose Luis González Moral, Sarriguren (ES); Rosario Martínez Ortigosa, Sarriguren (ES)

(73) Assignees: NANYANG TECHNOLOGICAL UNIVERSITY, Singapore (SG); SIEMENS GAMESA RENEWABLE ENERGY INNOVATION & TECHNOLOGY, S.L., Sarriguren (Navarra) (ES)

( * ) Notice: Subject to any disclaimer, the term of this patent is extended or adjusted under 35 U.S.C. 154(b) by 470 days.

(21) Appl. No.: 15/039,255

(22) PCT Filed: Oct. 24, 2014

(86) PCT No.: PCT/US2014/062151
§ 371 (c)(1),
(2) Date: May 25, 2016

(87) PCT Pub. No.: WO2015/061670
PCT Pub. Date: Apr. 30, 2015

(65) Prior Publication Data
US 2017/0162947 A1 Jun. 8, 2017

Related U.S. Application Data

(60) Provisional application No. 61/895,085, filed on Oct. 24, 2013.

(51) Int. Cl.
F03D 1/06 (2006.01)
H01Q 17/00 (2006.01)
H01Q 15/00 (2006.01)

(52) U.S. Cl.
CPC ............ *H01Q 17/00* (2013.01); *F03D 1/0675* (2013.01); *H01Q 15/0013* (2013.01);
(Continued)

(58) Field of Classification Search
CPC ............... F03D 1/0675; F05B 2230/31; F05B 2260/99; F05B 2280/2013; F05B 2280/6003; H01Q 17/00; H01Q 15/0013
(Continued)

(56) References Cited

U.S. PATENT DOCUMENTS 8,610,617 B1 * 12/2013 Avouris ................. H01Q 17/00
 342/13
2008/0011511 A1 * 1/2008 Niino ..................... H01Q 1/526
 174/363

(Continued)

FOREIGN PATENT DOCUMENTS

EP 1912487 A1 4/2008
JP 2008031193 A 2/2008

OTHER PUBLICATIONS

Filippo Costa et al: "Analysis and Design of Ultra Thin Electromagnetic Absorbers Comprising Resistively Loaded High Impedance Surfaces", IEEE Transactions on Antennas and Propagation, IEEE Service Center, Piscataway, NJ, US, vol. 58, No. 5, May 1, 2010 (May 1, 2010), pp. 1551-1558, XP011303914; ISSN: 0018-926X; 20100.

(Continued)

*Primary Examiner* — Aaron R Eastman
(74) *Attorney, Agent, or Firm* — Ladas & Parry LLP

(57) ABSTRACT

The invention provides a composite laminate comprising an outer, an intermediate and an inner section comprising, respectively, first layers of composite material and one or more functional layers having a printed circuit for absorbing the electromagnetic radiation incident on the composite laminate; second layers of composite material; a conducting layer contiguous to the intermediate section and third layers of composite material. The values of the resistivity of the functional layer and the thickness of the intermediate section are comprised in predefined ranges for the attenuation of the reflection of electromagnetic radiation of the composite laminate in the S or X bands up to a peak of −20 dB. The invention also refers to manufacturing methods of the composite laminate (11) and to wind turbine blades including the composite laminate.

21 Claims, 3 Drawing Sheets

(52) U.S. Cl.
CPC ....... *F05B 2230/31* (2013.01); *F05B 2260/99* (2013.01); *F05B 2280/2013* (2013.01); *F05B 2280/6003* (2013.01); *Y02E 10/721* (2013.01); *Y02P 70/523* (2015.11)

(58) Field of Classification Search
USPC ........................................................ 416/230
See application file for complete search history.

(56) References Cited

U.S. PATENT DOCUMENTS

| | | | |
|---|---|---|---|
| 2009/0047502 A1 | 2/2009 | Folaron et al. | |
| 2009/0214852 A1* | 8/2009 | Kelsey | B32B 5/02 428/315.9 |
| 2011/0008580 A1* | 1/2011 | Kagawa | B32B 15/08 428/167 |
| 2011/0316285 A1* | 12/2011 | Parsche | F03D 80/00 290/55 |
| 2012/0088036 A1* | 4/2012 | Greenhill | A42B 3/12 427/532 |
| 2012/0207612 A1* | 8/2012 | Fixter | F03D 1/065 416/229 R |
| 2013/0207867 A1* | 8/2013 | Georgescu | H01P 11/001 343/836 |
| 2013/0214181 A1* | 8/2013 | Delpech | H01Q 17/002 250/515.1 |
| 2013/0224023 A1* | 8/2013 | Kim | B32B 37/24 416/146 R |
| 2013/0284511 A1* | 10/2013 | Kagawa | H05K 9/0088 174/388 |
| 2013/0285846 A1* | 10/2013 | Kagawa | H01Q 17/00 342/1 |

OTHER PUBLICATIONS

Li Yanfei et al: "Research on low reflection Material of double layer medium structure", Electromagnetic Compatibility, 2007. EMC 2007. International Symposium on, IEEE, PI , Oct. 1, 2007 (Oct. 1, 2007), pp. 284-286, XP031198289; ISBN: 978-1-4244-1371-3; 2007.

Knott E.F. et al.: "Radar Absorbing Materials"; Jan. 1, 2004; Radar Cross Section; Scitech; Raleigh, NC; USA, pp. I-VI; XP002533024; ISBN:978-1-891121-25-8; 20.

Yu N Kazantsev et al: " Broadening of Operating Frequency Band of Magnetic-Type Radio Absorbers by FSS Incorporation"; IEEE Transactions on Antennas and Propagation, IEEE Service Center, Piscataway, NJ, US, vol. 58, No. 4, Apr. 1, 2010 (Apr. 1, 2010), pp. 1227-1235, XP011300619, ISSN: 0018-926X; 2010.

* cited by examiner

MICROWAVE ABSORBING COMPOSITE FOR TURBINE BLADE APPLICATIONS

CROSS-REFERENCE TO RELATED APPLICATION

This U.S. application claims priority under 35 U.S.C 371 to, and is a U.S. National Phase application of, the International Patent Application No. PCT/US2014/062151, filed 24 Oct. 2014, which claims priority from U.S. 61/895,085 filed 24 Oct. 2013, the disclosures of which are incorporated in their entirety by reference herein.

BACKGROUND OF THE INVENTION

With the growing prevalence of wind farms, conflicts are increasing between wind farm locations and electromagnetic radiations from radar systems. The USA Department of Energy's goal is to be generating 30% of the country's electricity using renewable energy sources by 2030. This will necessitate installation of thousands of wind turbines, exploiting the rich areas across the globe. However, around 20 GW of the potential wind energy is not accessible because it lies in the range of navigational radars. Wind turbines are large electromagnetic radiation reflectors and affect the radar operations. Reflection of radar from components of wind turbines causes several problems such as "radar systems used to monitor aviation traffic cannot easily discriminate between moving turbine blades and aircraft". Although towers and other components are stationary, they also cause problems. Their presence can be distinguished from aircraft, but they create a shadow zone, where presence of aircraft can be difficult to identify. Next table explains the wavelengths used by the different radar systems.

| Band | Frequency Range (GHz) | Wavelength Range | Uses |
|---|---|---|---|
| VHF | 50-330 MHz | 6 m to 90 cm | Very long-range surveillance |
| UHF | 300-1,000 MHz | 1 m to 30 cm | Very long-range surveillance |
| L | 1-2 GHz | 30 cm to 15 cm | Long-range surveillance, en route traffic control |
| S | 2-4 GHz | 15 cm to 7.5 cm | Moderate-range surveillance, terminal traffic control, long-range weather |
| C | 4-8 GHz | 7.5 cm to 3.8 cm | Long-range tracking, airborne weather |
| X | 8-12 GHz | 3.8 cm to 2.5 cm | Short-range tracking, missile guidance, mapping, marine radar, airborne intercept |
| Ku | 12-18 GHz | 2.5 cm to 1.6 cm | High resolution mapping, satellite altimetry |
| Ka | 27-40 GHz | 1.1 cm to 0.75 cm | Very high resolution mapping, airport surveillance |

Among these bands S and X band frequencies are of prime importance to the wind turbine radar cross section (RCS). There is a need to reduce the RCS of the wind turbines in S and X bands to avail the wind energy in this region. Reducing RCS of the turbine blade is the most critical task as the blade normally contains highly reflecting copper rod and has weight and shape constrains. Therefore efforts are focused on modification of wind turbine blades, so that they are invisible to the radar system. The accepted criterion for invisibility is attenuation of radar reflection/transmission up to −20 dB. Further, a robust design which could be implemented for a large scale of wind turbines is needed to install them in radar regions. Thus the design and composition of wind turbine blades should be less sensitive to variations in the manufacturing process and unavoidable errors.

There is known prior art to make invisible to radar wind turbine blades either by means of anti-radar coatings or using Frequency Selective Surfaces as described for example in WO 2010/122350. However, the prior art has not focused specifically to attenuation of radiation in the S and X bands which are those that most affect wind turbines.

BRIEF DESCRIPTION OF THE INVENTION

In one aspect, the invention provides a composite laminate comprising an outer, an intermediate and an inner section comprising, respectively, first layers of composite material and one or more functional layers having a printed circuit for absorbing the electromagnetic radiation incident on the composite laminate; second layers of composite material; a conducting layer contiguous to the intermediate section and third layers of composite material. The values of the resistivity of the functional layer and the thickness of the intermediate section are comprised in predefined ranges for the attenuation of the reflection of electromagnetic radiation of the composite laminate in the S or X bands up to a peak of −20 dB.

In one embodiment the resin of said layers of composite material is a polymer or an epoxy material, the resistivity of the functional layer is comprised between 40-60 Ω/sq (the term resistivity will be used referring to the sheet resistance of the layer along this specification when applied to the functional layer) and the thickness of the intermediate section is comprised between 9-11 mm, preferably between 10-11 mm.

In one embodiment the intermediate section comprises ceramic particles incorporated within it, preferably silica particles of sizes ranging between 20-500 nm.

In another aspect, the invention provides manufacturing methods of said laminate using pre-peg or infusion techniques.

In another aspect, the invention provides a wind turbine blade having at least one component, particularly a shell, including the above-mentioned laminate.

Other characteristics and advantages of the present invention will be clear from the following detailed description of embodiments illustrative of its object in relation to the attached figures.

DETAILED DESCRIPTION OF THE INVENTION

The invention mainly refers to a laminate which is to be used, for example, as the outer part of the whole laminate— whether a monolithic laminate or a sandwich laminate—of a component of a wind turbine blade.

Figure 1:
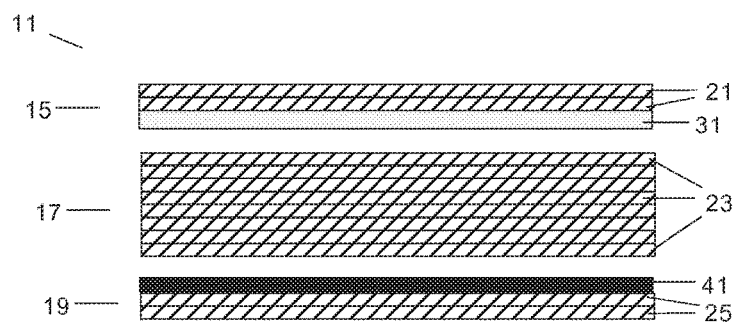
FIGS. 1, 2 and 3 are schematic sectional views of embodiments of a composite laminate with enhanced microwave absorption according to the invention.

In reference to FIG. 1, the basic structure of an embodiment of a laminate 11 developed to absorb the microwave radiation in S and X band comprises: an outer section 15 formed by composite layers 21 and one or more functional layers 31; an intermediate section 17 formed by composite layers 23; and an inner section 19 formed by at least one electrically conducting layer 41 and composite layers 25.

Composite layers 21, 23, 25 are made up of resin materials and fibers with high mechanical properties that form hard sheets attached to each other after curing providing the required mechanical strength (hardness, tensile strength, etc.). The composite layers 21, 23, 25 may comprise glass fiber or carbon fiber cloths and epoxy or polymeric resin. They may also comprise other fibers such as aramids, basaltic fibers or boron fibers as well as polymeric resins such as polyesters or vinyl esters.

The functional layer 31 is made up of glass fibers and conducting ink (carbon based) and is placed between the composite layers 21, 23.

The electrically conducting layer 41—a sheet, mesh or foil made up of, for example, aluminum, copper or carbon—is placed between the composite layers 23, 25.

Figure 2:
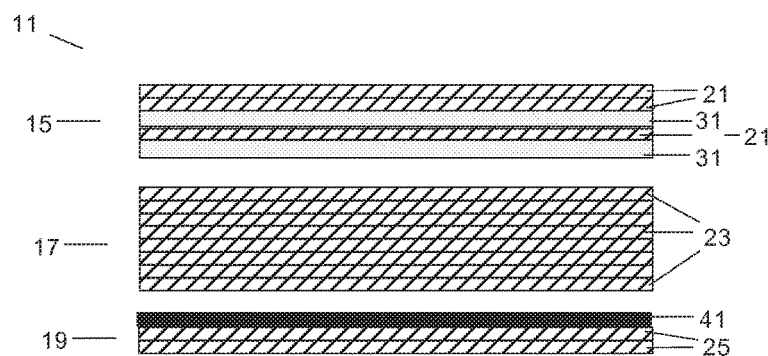
Figure 3:
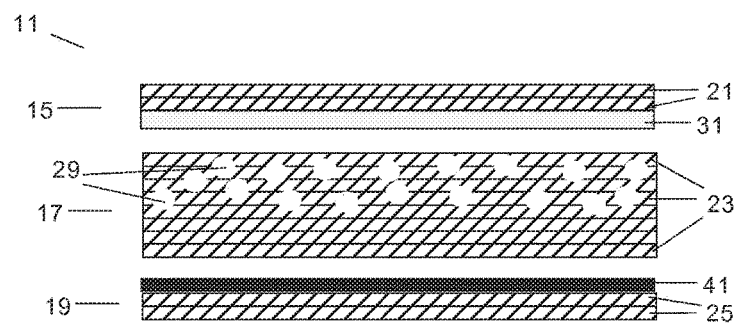

Additional Features of the Laminate 11 a) To obtain the attenuation over broad spectrum of frequencies, functional grading of the conducting pattern is employed as shown in FIG. 2. Two functional layers 31 with different functionality, i.e. different pattern or different resistivity values, are employed at more than one location in the laminate. Such incorporation creates more than one capacitance value leading to broad band attenuation.

b) Broad band attenuation is critically important for the practical applications of the laminates of the invention to wind turbine blades. The size of the blade may be higher than 80 m (in length). From the manufacturing point of view above said layers are to be joined together for form a component of a large blade (for example a shell). During this process the variation in the separation, distance, resistivity, flatness and smoothness of the functional layer 31 would affect the attenuation results. Design shown in FIG. 2 is forgiving to the errors and variations in manufacturing process.

c) FIG. 3 shows the incorporation of ceramic nanoparticles (with suitable permittivity values) within the laminate 11 that has two main effects on the properties of the laminate. First it results in increase of the permittivity values, which reduces the distance between the functional layer 31 and the conducting layer 41 allowing flexibility in the manufacturing process, particularly at the complex shapes such as curves of leading edge where the separation distance is more difficult to control due to the limitations of the manufacturing process of highly curved composite laminates. Secondly, addition of specific ceramic particles, such as silica nanoparticles, improves the compression toughness/strength of the laminate 11 and may also lead to reduced number of layers of carbon fibers, saving the cost and weight. The location of the ceramic particles could be anywhere within the laminate 11. Typically, $SiO_2$ nanoparticles of sizes ranging from 20-500 nm are employed as fillers. Further, the quantity of ceramic fillers may vary from 0 to 20% by weight.

Manufacturing Method of the Laminate 11

In an embodiment, the manufacturing method comprises the following steps:

a) The composite layers 21, 23, 25—provided as pre-peg layers—, the functional layer 31 and the conducting layer 41 are arranged in the manner shown in FIG. 1. It is ensured that the layers are made completely flat without wrinkles and air gaps. The functional layer 31 is prepared printing a conducting pattern with an ink with an appropriate resistivity on a fiber glass cloth using a semi-automatic screen printer. The printed patter is characterized by 4-point resistivity measurement.

b) The arrangement of layers 21, 31, 23, 41, 25 is enclosed in a vacuum bag and a vacuum of 0.9 ATM is maintained with the help of a compressor.

c) The whole arrangement is kept in an oven and the temperature is set at 900 with the maximum ramping rate the oven possesses from the room temperature (25°).

d) After two hours of heating the vacuum pump is switched off and the temperature of the oven is set at 25°.

e) The laminate is taken out from the oven and the air cools it to room temperature.

The laminate 11 can also be manufactured using infusion techniques providing the first, second and third layers 21, 23, 25 as dry layers, infusing resin and subjecting the ensemble of the outer, intermediate and inner sections 15, 17, 19 to a cycle of pressure and temperature to consolidate the composite laminate 11.

Microwave Absorption of the Laminate

Figure 4:
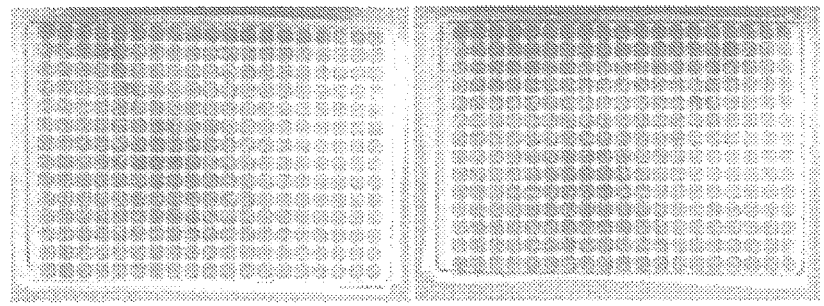
FIG. 4 shows photos of two samples of a composite laminate with enhanced microwave absorption.

Experimental tests carried out with samples of the laminate (see FIG. 4) have shown that the critical parameters on the absorption of the S and X bands are on the one hand the resistivity of the functional layer 31 and on the other hand the separation between the functional layer 31 and the conducting layer 41.

Figure 5:
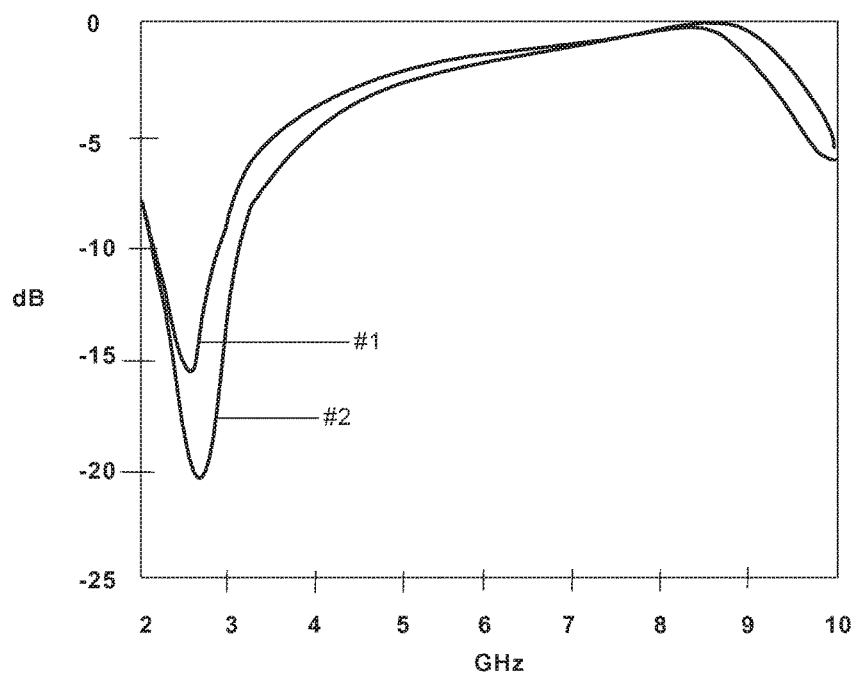
FIG. 5 shows diagrams Absorption (dB) vs Frequency (GHz) for samples #1 and #2 of a composite laminate with enhanced microwave absorption.

The effect of the variation of the resistivity of the functional layer is shown in FIG. 5 for samples #1, #2 having functional layers 31 with a resistivity of, respectively, 47.74 and 57.53 Ω/sq: an increase in the resistivity of the functional layer 31 shifts the absorption towards higher frequencies and lowers the degree of attenuation. The resistivity of the functional layer 31 can be changed by the amount of ink deposited on the glass fiber cloth.

Figure 6:
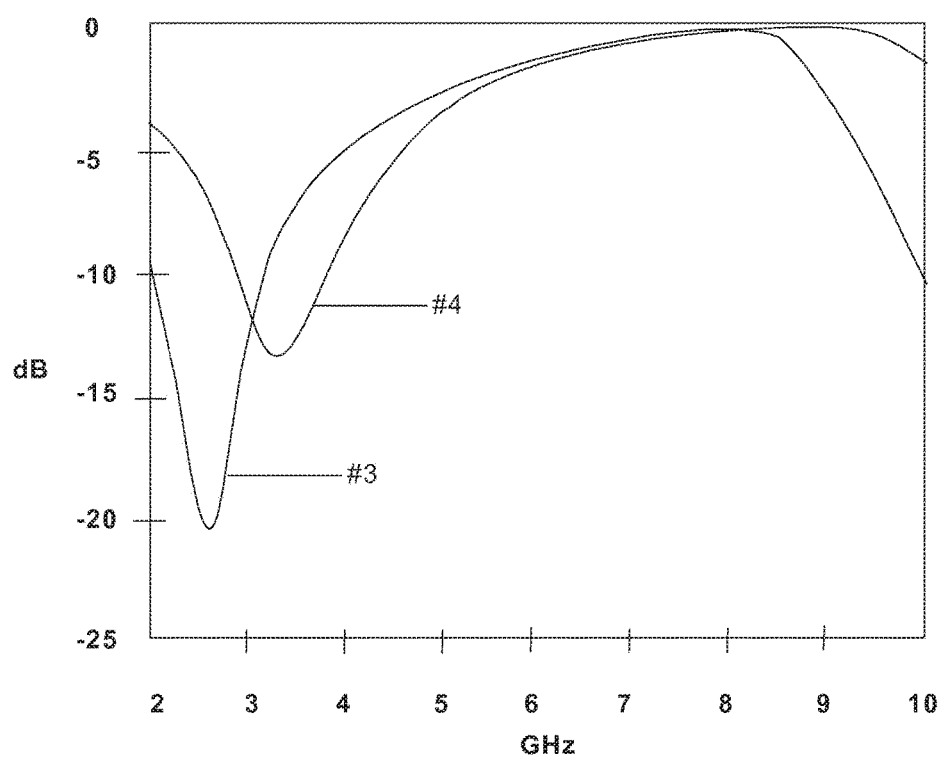
FIG. 6 shows diagrams Absorption (dB) vs Frequency (GHz) for samples #3 and #4 of a composite laminate with enhanced microwave absorption.

The effect of the separation between the functional layer 31 and the conducting layer 41 is shown in FIG. 6 for samples #3, #4 having a separation of, respectively, 11.46 mm and 9.43 mm: an increase in separation between the functional layer 31 and the conducting layer 41 shifts the absorption towards the lower frequencies and improves the degree of attenuation. Said separation is controlled by the number of layers 23.

From the experimental work carried out it can be concluded that the absorption of wavelength in S and X bands requires a specific pair of values of the separation between the functional layer 31 and the conducting layer 41 and the resistivity of the functional layer 31 comprised in, respectively, the following ranges: 9.0-11.0 mm (preferably 10.0: 11.0 mm); 40-60 Ω/sq.

Advantages

The weight added by the functional layer 31 and the conducting layer 41 to a wind turbine blade is minimal compared with the weight of a radar absorbing coating.

The laminate of the invention is specifically addressed to the absorption of the S and X bands which are the critical bands for wind turbines.

The laminate of the invention allows attenuation in reflection as well as transmission up to a peak of −20 dB.

The laminate of the invention is highly robust and forgiving to the manufacturing errors and variations.

The laminate of the invention can be manufactured with 3D features and therefore can be adapted to the shape of a wind turbine blade which is critically important to its performance.

Although the present invention has been described in connection with various embodiments, it will be appreciated from the specification that various combinations of elements, variations or improvements therein may be made, and are within the scope of the invention.

The invention claimed is:

1. A composite laminate (11) comprising:
an outer section (15) comprising a plurality of first layers (21) of composite material and at least one functional layer (31) having a printed circuit for absorbing the electromagnetic radiation incident on the composite laminate (11);
an intermediate section (17) comprising a plurality of second layers (23) of composite material;
an inner section (19) comprising a conducting layer (41) contiguous to and in contact with the intermediate section (17) and a plurality of third layers (25) of composite material;
wherein each of the plurality of first, second and third layers comprises fibers and a resin, and wherein the values of the resistivity of the at least one functional layer (31) and the thickness of the intermediate section (17) are comprised in predefined ranges to achieve a desired attenuation of the reflection of electromagnetic radiation of the composite laminate (11) in an S or X band up to a peak of −20 dB.

2. The composite laminate (11) of claim 1, wherein:
the resin of the composite material of the first, second and third layers (21, 23, 25) is a polymer or an epoxy material;
the resistivity of the functional layer (31) is comprised between 40-60 $\Omega$/sq and the thickness of the intermediate section (17) is comprised between 9-11 mm.

3. The composite laminate (11) of claim 2, wherein the thickness of the intermediate section (17) is comprised between 10-11 mm.

4. The composite laminate (11) of claim 3, wherein the fibers of the composite material of the first, second and third layers (21, 23, 25) are glass fibers or carbon fibers.

5. A wind turbine blade having at least one component made with the composite laminate of claim 4.

6. A wind turbine blade having at least one component made with the composite laminate of claim 3.

7. The composite laminate (11) of claim 2, wherein the intermediate section (17) comprises ceramic particles (29) incorporated within it.

8. The composite laminate of claim 7, wherein the ceramic particles (29) are silica particles of sizes ranging between 20-500 nm.

9. A wind turbine blade having at least one component made with the composite laminate of claim 8.

10. A wind turbine blade having at least one component made with the composite laminate of claim 7.

11. A wind turbine blade having at least one component made with the composite laminate of claim 2.

12. A wind turbine blade having at least one component made with the composite laminate of claim 1.

13. The wind turbine blade of claim 12 wherein said component is a shell of the blade.

14. A method for manufacturing the composite laminate according to claim 1, comprising the steps of:
(a) providing a plurality of first pre-preg layers, second pre-preg layers and third pre-preg layers, wherein each of the plurality of first, second and third pre-preg layers comprises fibers and a resin;
(b) assembling the first, second and third pre-preg layers, the at least one functional layer and the conducting layer into an ensemble comprising the outer section and the inner section sandwiching the intermediate section with the plurality of the first pre-preg layers and the at least one functional layer in the outer section, the plurality of second pre-preg layers in the intermediate section, the plurality of third pre-preg layers and the conducting layer in the inner section and with the conducting layer contiguous to the intermediate section; and
(c) subjecting the ensemble to a cycle of pressure and temperature to consolidate the composite laminate.

15. The method according to claim 14, comprising controlling a number layers in the intermediate section to achieve the desired attenuation of the reflection of electromagnetic radiation of the composite laminate.

16. The method according to claim 15, comprising incorporating ceramic nanoparticles into the plurality of second layers in the intermediate section to reduce a distance between the functional layer and the conducting layer necessary to achieve the desired attenuation of the reflection of electromagnetic radiation of the composite laminate.

17. The method according to claim 15, comprising incorporating a second functional layer into the outer section such that the composite laminate obtains the attenuation over a broader spectrum of frequencies.

18. A method for manufacturing the composite laminate according to claim 1, comprising the steps of:
(a) providing a plurality of first dry layers, second dry layers and third dry layers, wherein each of the plurality of first, second and third dry layers comprises fibers;
(b) assembling the first, second and third dry layers, the at least one functional layer and the conducting layer into an ensemble comprising the outer section and the inner section sandwiching the intermediate section with the plurality of the first dry layers and the at least one functional layer in the outer section, the plurality of second dry layers in the intermediate section, the plurality of third dry layers and the conducting layer in the inner section and with the conducting layer contiguous to the intermediate section;
(c) infusing resin into the first, second and third dry layers; and
(d) subjecting the ensemble to a cycle of pressure and temperature to consolidate the composite laminate.

19. The method according to claim 18, comprising controlling a number layers in the intermediate section to achieve the desired attenuation of the reflection of electromagnetic radiation of the composite laminate.

20. The method according to claim 18, comprising incorporating ceramic nanoparticles into the plurality of second layers in the intermediate section to reduce a distance between the functional layer and the conducting layer necessary to achieve the desired attenuation of the reflection of electromagnetic radiation of the composite laminate.

21. The method according to claim 18, comprising incorporating a second functional layer into the outer section such that the composite laminate obtains the attenuation over a broader spectrum of frequencies.

* * * * *